Feb. 13, 1962
G. EGGERS ETAL
3,020,714
DEVICE FOR CONTROLLING THE JET OF A
REACTION PROPULSION MOTOR
Filed June 27, 1957
11 Sheets-Sheet 1
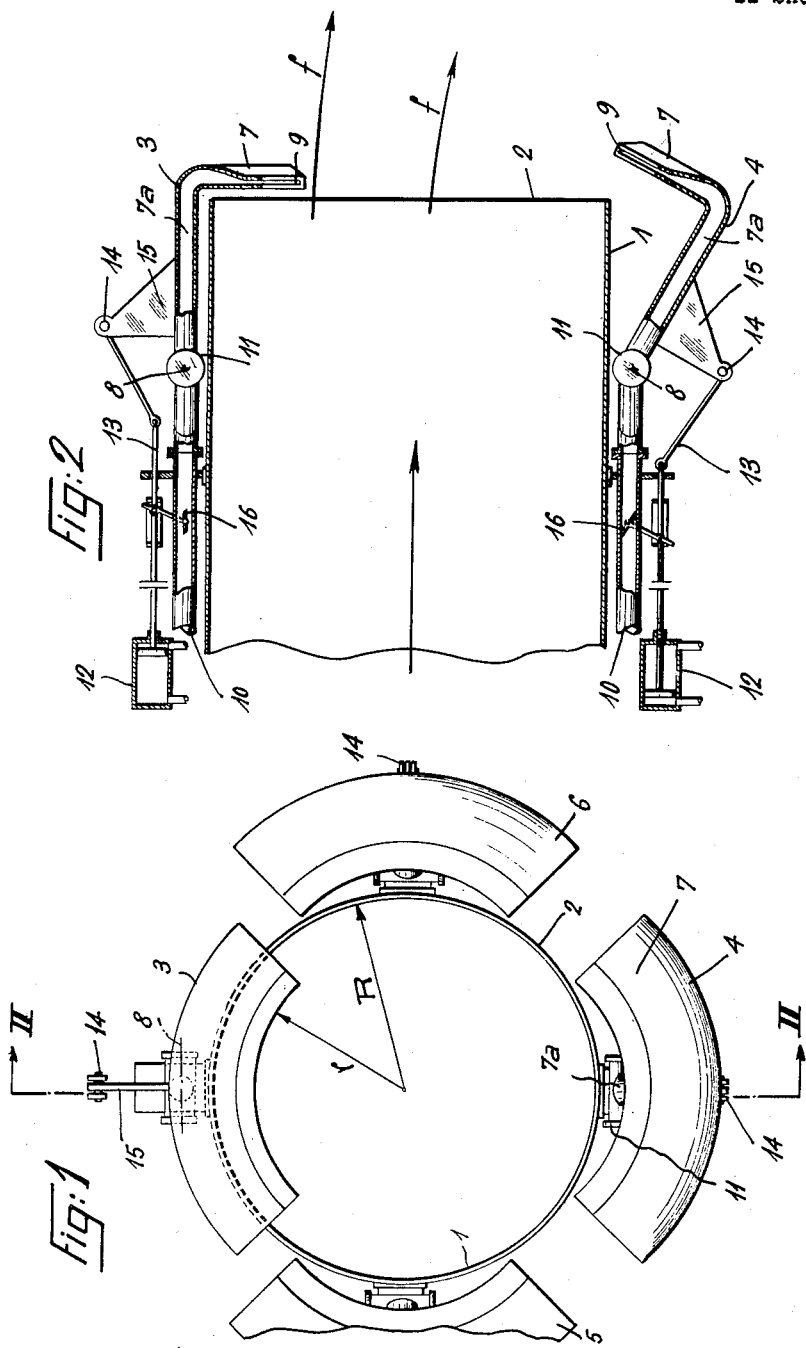
INVENTORS
Gerhard Eggers
Gunther Ernst
By
Watson, Cole, Grindle & Watson
ATTORNEYS

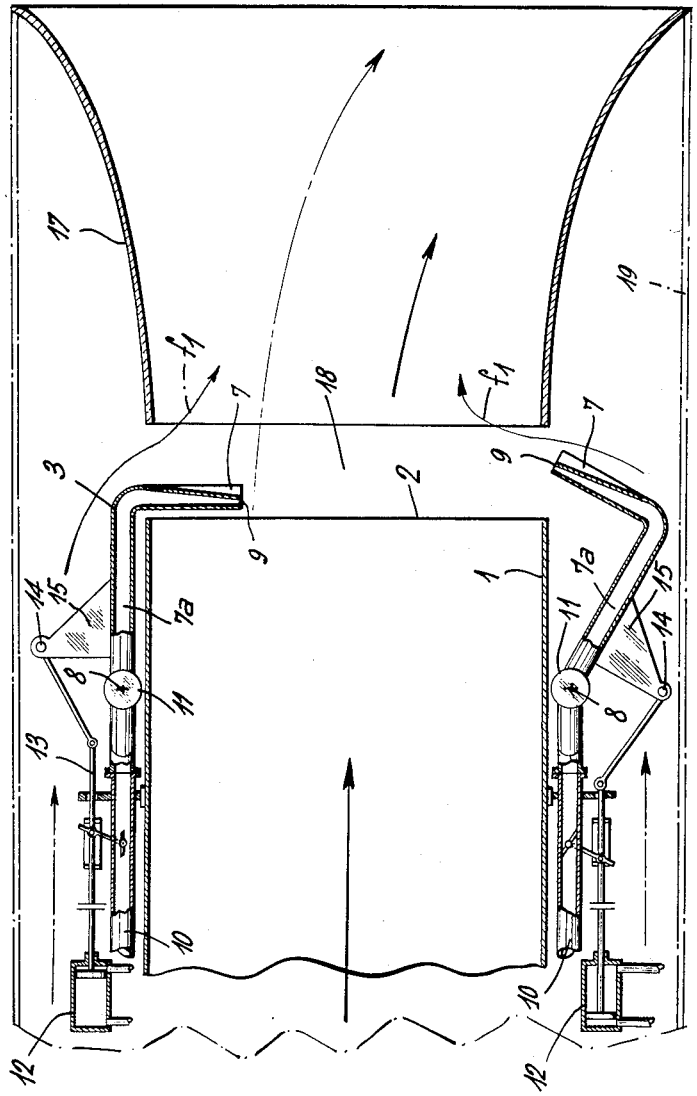

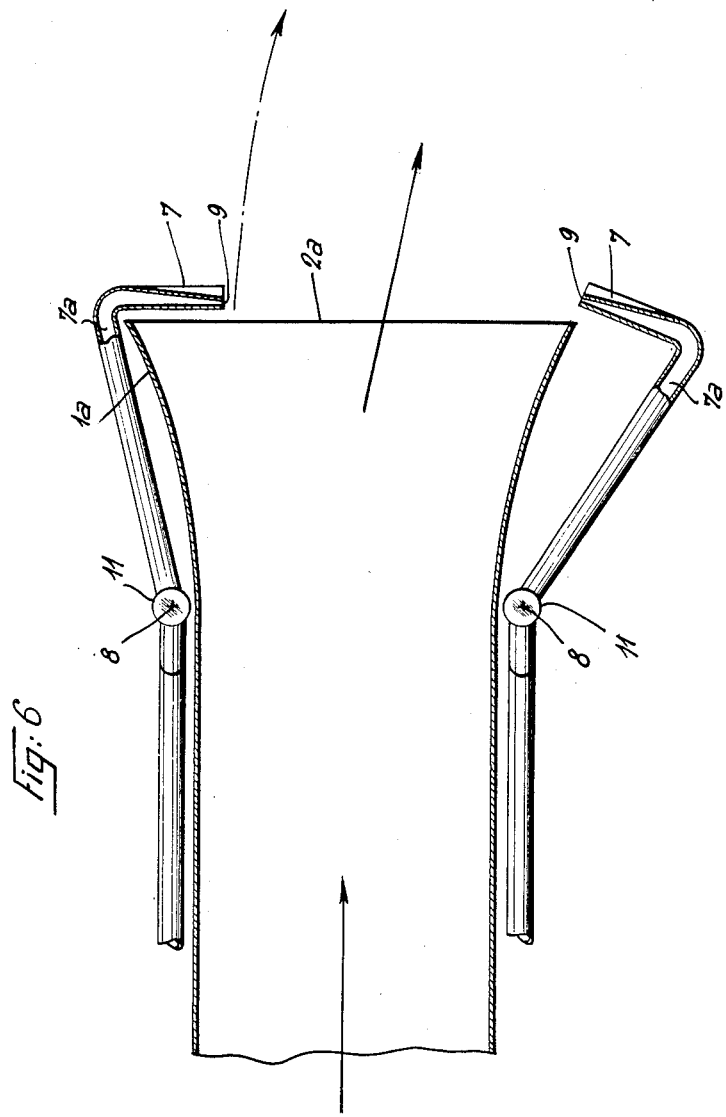

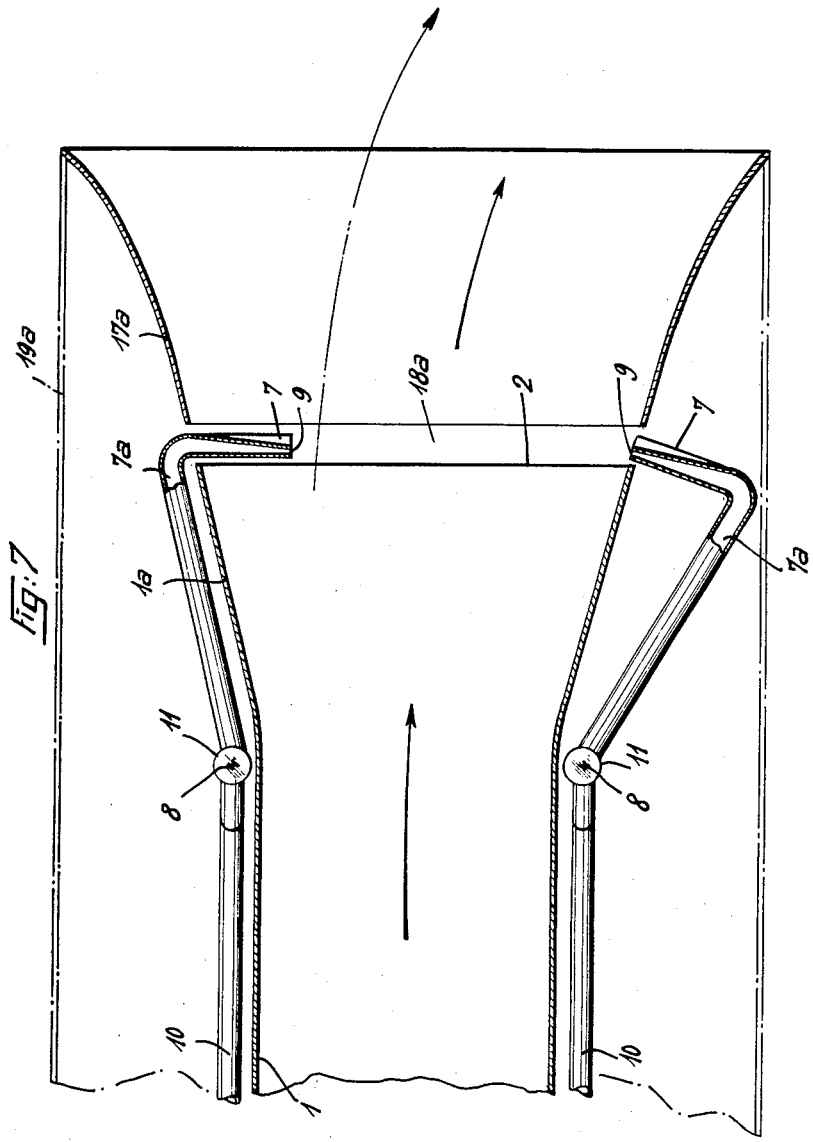

Feb. 13, 1962  G. EGGERS ETAL  3,020,714
DEVICE FOR CONTROLLING THE JET OF A
REACTION PROPULSION MOTOR
Filed June 27, 1957  11 Sheets-Sheet 6
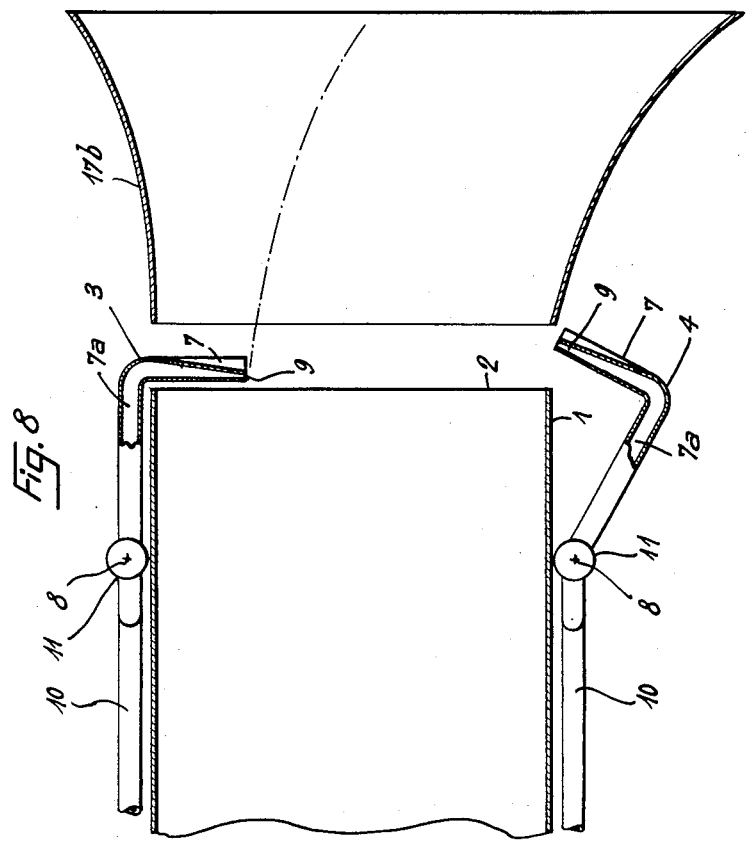
INVENTORS
Gerhard Eggers
Gunther Ernst
By Watson, Cole, Grindle & Watson
ATTORNEYS

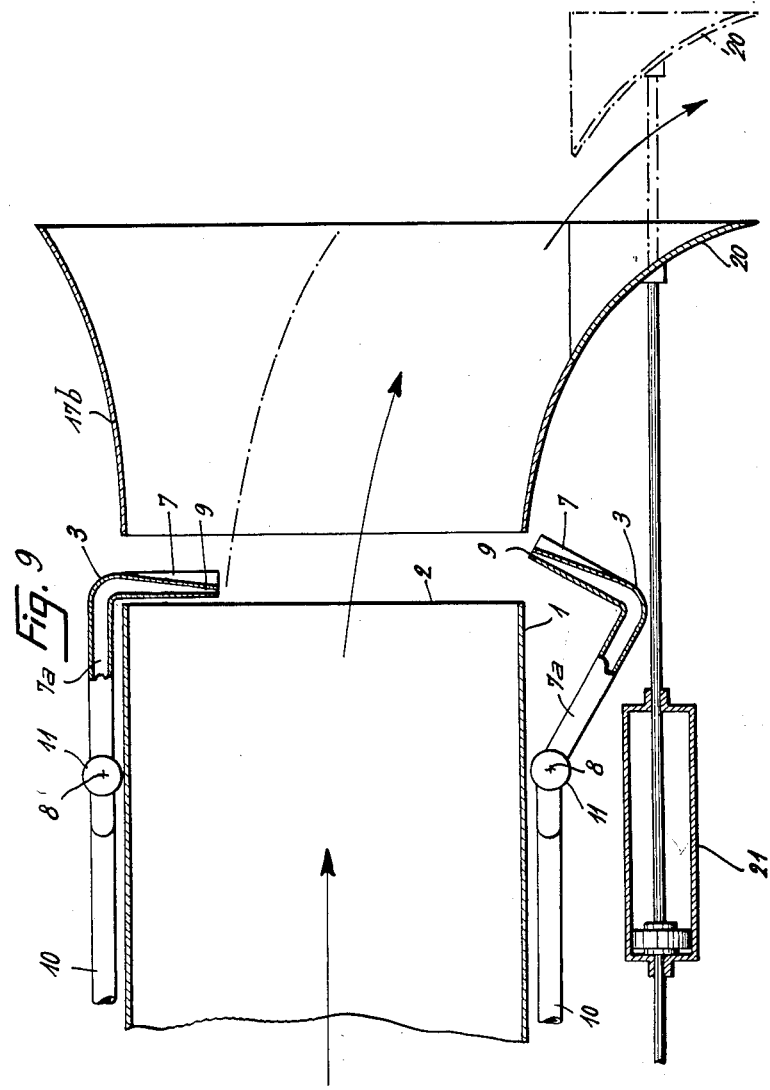

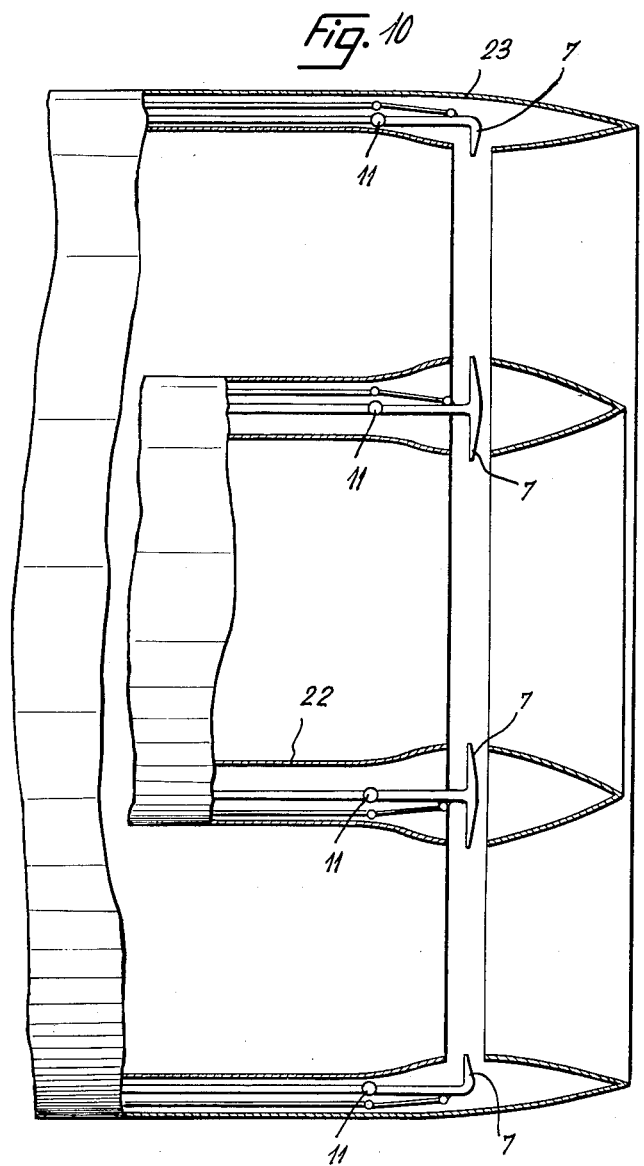

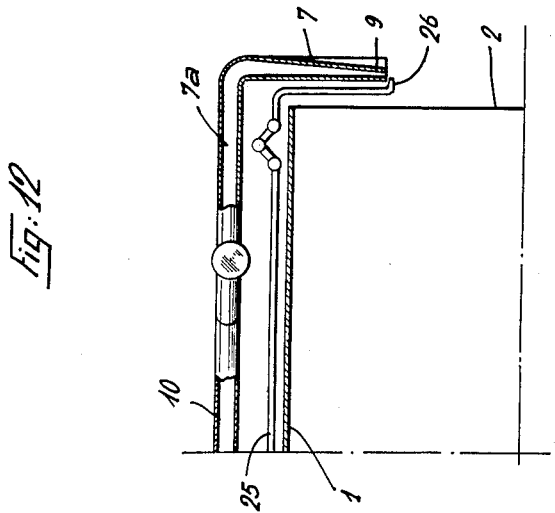
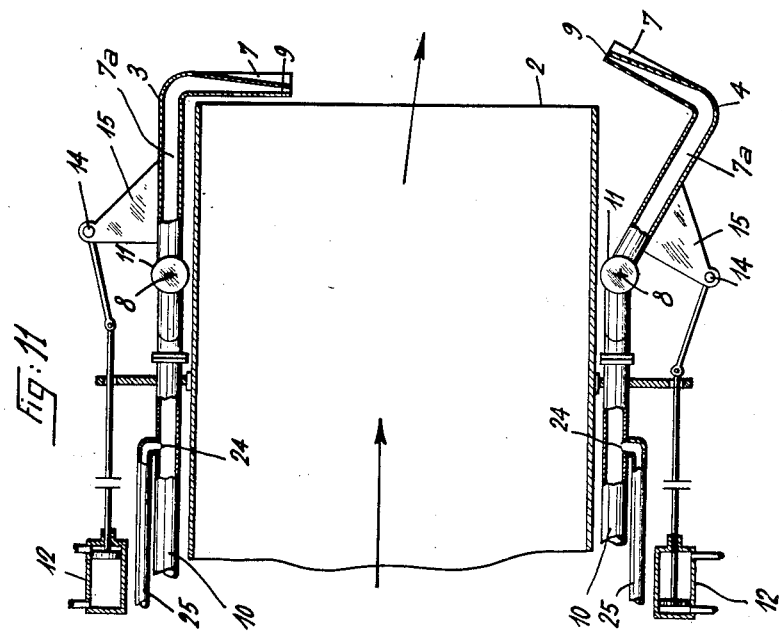

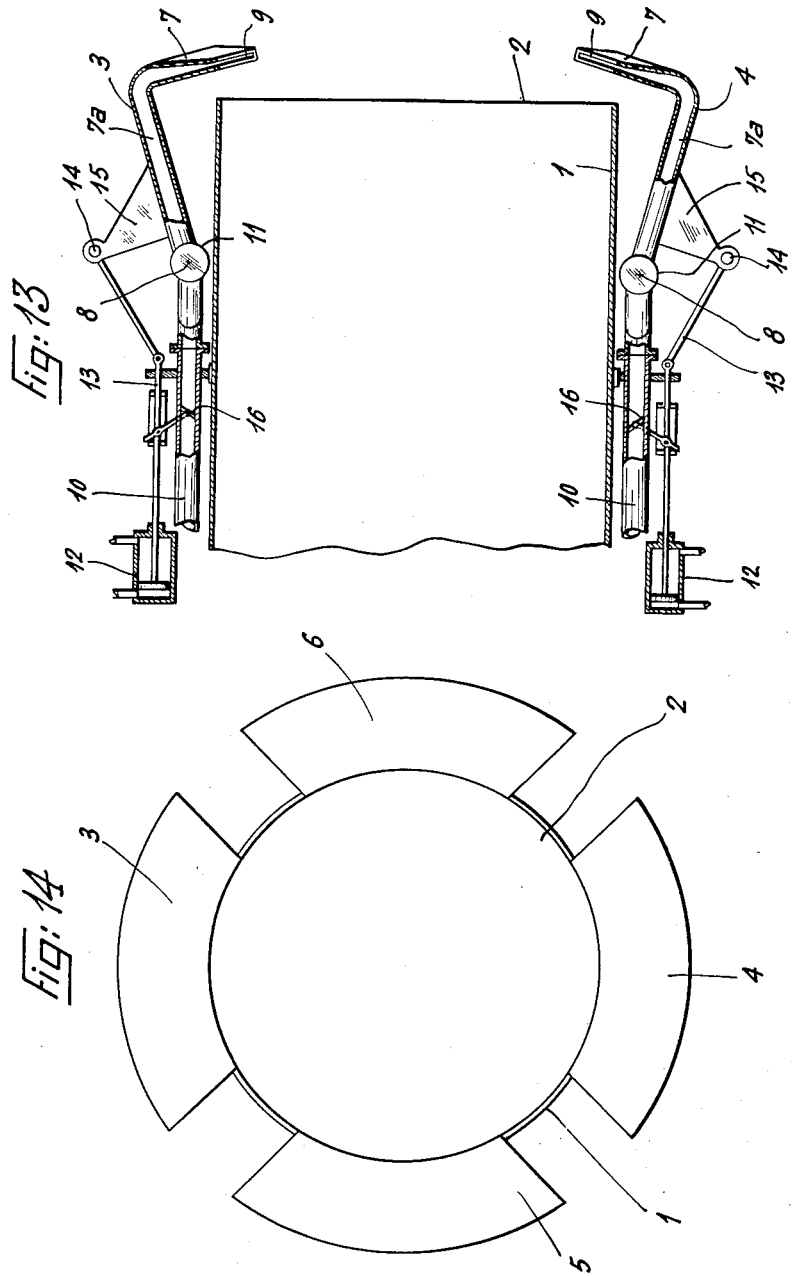

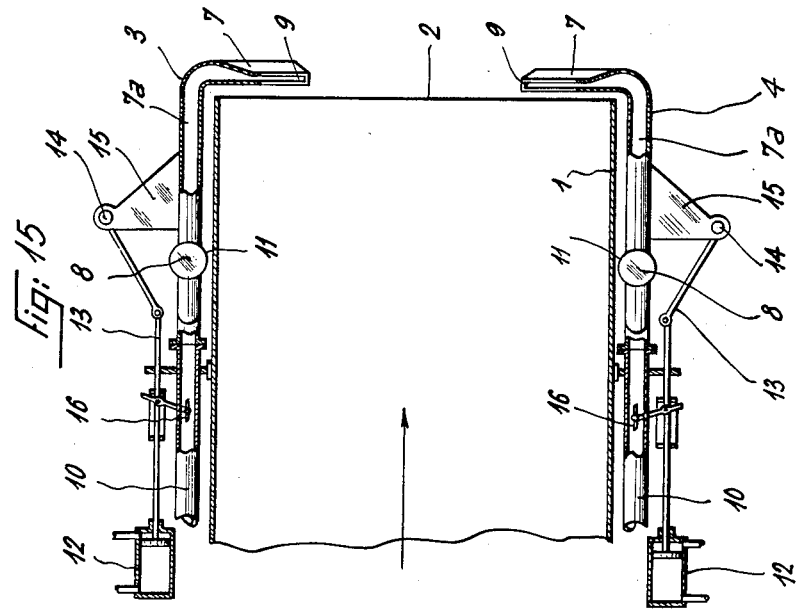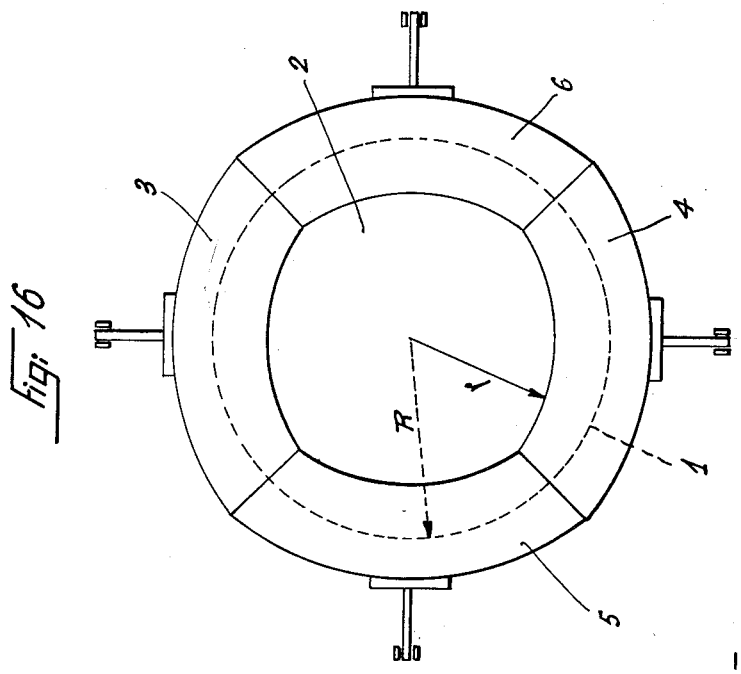

United States Patent Office 3,020,714
Patented Feb. 13, 1962

3,020,714
DEVICE FOR CONTROLLING THE JET OF A REACTION PROPULSION MOTOR
Gerhard Eggers and Gunther Ernst, Dammarie les Lys, France, assignors to Societe Nationale d'Etude et de Construction de Moteurs d'Aviation, Paris, France
Filed June 27, 1957, Ser. No. 668,423
Claims priority, application France July 3, 1956
9 Claims. (Cl. 60—35.54)

The present invention relates to groups and installations of reaction propulsion units in which a gas flowing in a discharge conduit is expanded into the atmosphere to produce a thrust, these groups comprising, amongst others, turbo-jet units and ram-jet units.

It is known that it is necessary to adapt the outlet section of the discharge nozzle of reaction propulsion units or groups of such units to their different conditions of workings, such as acceleration or deceleration, operation with or without after-combustion reheat, and also to the different conditions of flight such as altitude and speed.

Experience has shown furthermore, that under certain conditions of use, especially in the trans-sonic and supersonic ranges, the aerodynamic controls prove to be defective, contrary to controls which have a direct action on the propulsive jet. These latter controls find a particularly useful application during the landing and taking-off vertically of machines designed for that purpose, the speeds of flight then being low if not zero and rendering inoperative the aerodynamic controls.

The present invention has for its object a device which permits of the regulation of the section of the discharge nozzle and also the deflection of the jet in order to create controlling couples for the piloting of the aircraft.

In accordance with the invention, the deflection of the jet and the variation of the outlet cross-section of the discharge nozzle are obtained either by a mechanical action, or by a pneumatic action, or finally by simultaneous mechanical and pneumatic action.

The device in accordance with the present invention comprises essentially retractable members mounted at the periphery of the discharge nozzle, preferably at opposite parts of the said nozzle, and which can be caused to project into the jet in order to form solid obstacles, these members being terminated by auxiliary nozzles directed towards the axis of the discharge pipe and being adapted for supply with compressed air or other fluid under pressure so as to form transverse auxiliary jets in the centre of the propulsive jet, these auxiliary jets reinforcing the action applied by the soild obstacles.

In accordance with one special feature of the invention, the retractable members are actuated by independent operating devices, which enables them to be operated either in a symmetrical manner in order to produce an effect of constriction on the jet without changing its direction, or in an asymmetrical manner in order to deflect the jet in a desired direction and thus to produce a corresponding control couple.

The description which follows below with reference to the accompanying drawings (which are given by way of example only and not in any sense by way of limitation), will make it quite clear how the invention may be carried into effect, the features which are brought out, either in the text or in the drawings, being understood to form a part of the said invention.

FIG. 1 is a diagrammatic end view of a discharge nozzle provided with a deflection and constriction device in accordance with the invention.

FIG. 2 is an axial cross-section taken along the line II—II of FIG. 1.

FIGS. 5 to 9 are cross-sections similar to that of FIG. 2 showing the application of the device of the invention to five alternative forms of construction of discharge nozzles.

FIG. 10 is an axial cross-section of a combined propulsion unit comprising a turbo-jet unit and a ram-jet unit, equipped with the device of the present invention.

FIGS. 11 and 12 show diagrammatically two methods of control of the auxiliary jet employed for the deflection of the main jet and for the constriction of the discharge nozzles.

FIGS. 13 and 14 are diagrammatic views in longitudinal cross-section and end view of an open discharge nozzle during its operation with after-combustion.

FIGS. 15 and 16 are similar views showing the case of a closed discharge nozzle, without after-combustion.

Figure 3:
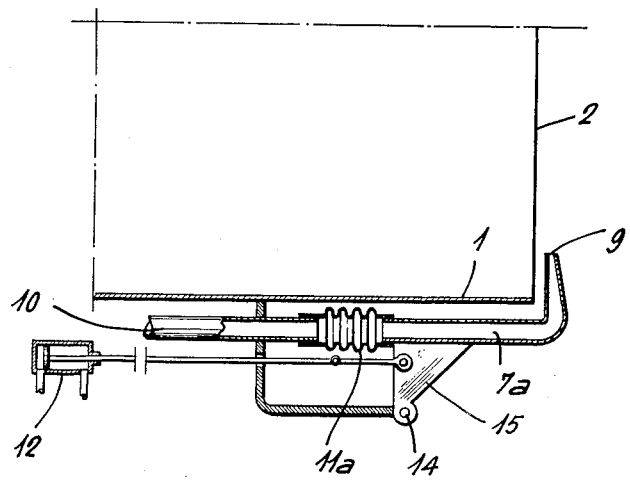
FIGS. 3 and 4 show on a larger scale two alternative forms of a detail of construction.

In FIGS. 1 and 2, there can be seen at 1 a nozzle having the shape of a body of revolution, discharging into the atmosphere through a circular opening 2. At the periphery of the nozzle 1 and in the vicinity of its outlet opening 2, are spaced four articulated flaps 3—4, 5—6 arranged in oppositely-disposed pairs and each having a rear portion 7 in the form of an annular arc extending over a quarter of a circle, these rear portions being extended towards the front by an elbow at 90° and a tubular member 7a. The flaps 3—4, 5—6 pivot about an axis 8 tangential to the nozzle so as to come into the position shown in the upper part of FIGS. 1 and 2, and in FIGS. 15 and 16, in which the segments 7 project into the discharge nozzle; on the other hand, as shown in the lower part of FIGS. 1 and 2, and in FIGS. 13 and 14, the flaps may be withdrawn towards the exterior of the discharge nozzle.

The flaps 3—4, 5—6 are hollow and form conduits which terminate in auxiliary nozzles or blowing slots 9 extending over a quarter of a circle and directed towards the axis of the discharge nozzle. These auxiliary nozzles communicate by means of tubular members 7a with separate supply conduits 10 for compressed air, preferably derived from the delivery or from an intermediate stage of the air compressor in the case of a turbo-jet unit or of the intake diffuser in the case of a ram-jet unit. The stationary piping systems 10 are connected to the tubes 7a of the pivoted flaps by appropriate joints of any particular type.

Figure 4:
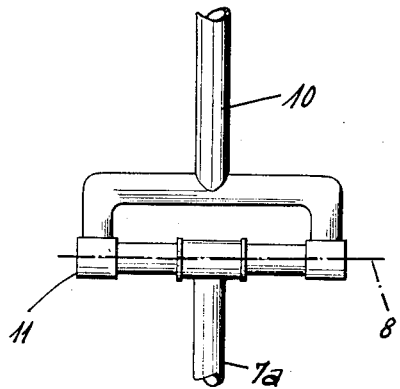

An example of a rotating joint which permits of the articulation of the flaps is shown in FIG. 4 at 11. These joints may also be of an entirely different type: there has been shown by way of example an alternative form in FIG. 3, in which the rotating joint 11 has been replaced by an elastic joint 11a of the bellows type.

Each flap is operated by means of a jack 12, for example a double-acting hydraulic jack coupled by a rod system 13 to a shaft 14 carried by a small plate 15 rigidly fixed to the flap.

In addition, the rod system 13 is arranged in such manner as to control a valve 16 provided in each piping system 10, the arrangement being such that in the projecting position of the flaps shown in the upper part of FIG. 2 and of FIG. 15, the valve 16 is open, whilst in the retracted position (lower part of FIG. 2 and of FIG. 13) the valve 16 is closed.

The device which has just been described operates in the following manner:

When it is desired to reduce the outlet cross-section of the discharge nozzle, the whole of the hydraulic jacks 12 is supplied with fluid in such manner as to put the four flaps 3—4, 5—6 into a projecting position in the propulsive jet (position shown in FIGS. 15 and 16). These flaps in the form of an arc of a circle or a form adjacent thereto, come into contact with each other and reduce the radius of the outlet opening of the discharge nozzle from the value R to the value r. In addition, the valve 16 being then open, the nozzles 9 are supplied with compressed air and produce transverse auxiliary jets which form an annular fluid screen having the action of further reducing the cross-section of the discharge-nozzle.

Aerodynamic constriction devices for a discharge nozzle have been described by the present applicants, particularly in their French Patent No. 1,030,483 of January 4, 1951. In this case however, it was a question of blowing slots provided on a fixed support and having no action on the propulsive jet and not as in the present invention, of slots located on movable flaps adapted to apply through their solid surface an effect of constriction to which is added that of the auxiliary jets.

In order to restore the full section of the discharge nozzle, constituted by its outlet opening 2, for example during operation with after-combustion, the hydraulic jacks 12 are operated in such manner as to withdraw the flaps in the manner shown in the lower parts of FIGS. 1 and 2 and in FIGS. 13 and 14. The valves 16 then being closed, the air under pressure no longer reaches the nozzles 9.

It is quite clear that the effect of constriction can be varied by bringing the blowing flaps into a position intermediate between that which is shown in the lower part of FIG. 2 and in FIG. 13 (with the flap fully retracted), and that shown at the upper part of this FIG. 2 and in FIG. 15 (with the flap fully projecting); the flaps then project to a greater or less extent into the propulsive jet, and the supply of compressed air to the nozzles 9 is more or less considerable, depending on the angular position of these flaps and in consequence of the position of the valves 16.

Instead of acting symmetrically on the flap-nozzles, they can be actuated in an asymmetric manner in order to deflect the jet in a desired direction and thus to create a corresponding controlling couple. Such an asymmetric action may be easily obtained since each flap-nozzle is controlled by a separate hydraulic jack 12 and its supply with compressed air is also regulated in an independent manner by a valve 16.

Thus, if only the single flap 3 is brought into the projecting position as shown in FIGS. 1 and 2, the arcuate segment 7 of this flap forms a solid deflecting obstacle in the center of the jet, the action of which is reinforced by the auxiliary jet of compressed air produced by the nozzle 9 which creates a fluid obstacle forming an extension of the solid obstacle 7. The jet is then deflected as shown by the arrow f, that is to say downwards, which produces a diving moment on the aircraft.

In order to obtain an opposite effect, that is to say a nose-lift moment, the flap-nozzle 4 will be actuated, the others remaining in the retracted position. In the same way, the projection of the flap-nozzles 5 or 6 will produce a directional couple towards the right or towards the left. Finally, by suitably varying their supply, the action of various flaps can be combined in order to obtain a directional rudder and amplitude effect as may be desired.

Deflection devices using solid or fluid obstacles have been described by the applicant company, especially in its French Patents No. 1,010,405 of August 11, 1948, and its Addition No. 60,250 of April 28, 1950, and also in French Patent No. 1,020,287 of June 16, 1950. As previously indicated however, the novel feature of the present invention resides in the combination of a solid obstacle and a fluid obstacle forming an extension thereto.

A first advantage of the combination of the two actions is that the height of the injector obstacles 7—9 may be reduced to very small values, which reduces the driving power required for their operation; thus the operating devices used may be of less weight, size and power.

A further advantage of this device is that the injector obstacles 7—9 are appreciably cooled by the passage of the compressed air, especially when they are located on the path of the jet, which is a particular advantage in the case of reactors with after-combustion.

It will of course be understood that without departing from the scope of the invention, it will be possible to provide a separate control for the angular position of the flaps and their supply with compressed air, which would enable them to be used either as solid obstacles or fluid obstacles.

The deflection effect may be increased by the use of a divergent extension of the wall of the nozzle, intended to stabilise and reinforce the deflection produced by the solid and fluid obstacles.

FIG. 5 shows the arrangement of a divergent extension 17 of this kind, which forms a divergent conduit located behind the outlet opening 2 of the discharge nozzle 1. An annular space 18 is formed between the nozzle 1 and the divergent conduit 17 in order to permit the passage of the hinged flap-nozzles.

Through this space 18, the air surrounding the nozzle 1 may pass into the extension 17 as shown by the arrows f1, under the induction effect produced by the propulsive jet discharged at high speed from the opening 2 of the nozzle. The air thus sucked in can be previously channelled by a cowling 19 (shown in chain-dotted lines) surrounding the nozzle together with the operating and supply device for the flap nozzles. This induced air very effectively cools the walls of the nozzle 1 and of the extension 17, together with the various members forming part of the deflection and constriction device.

FIGS. 6 shows the application of this device to the outlet 2a of a discharge nozzle comprising a divergent downstream portion 1a, which enables a deflection effect to be obtained already on the upstream side of the flap-nozzles 7—9, whilst FIG. 7 shows the arrangement of a divergent extension 17a at the outlet of this nozzle and preferably of a cowling 18a so as to channel the air sucked-in by the ejector effect into the annular space 18a which separates the outlet of the discharge nozzle from the inlet of the extension 17a.

FIG. 8 shows a discharge nozzle having an asymmetric extension 17b with different radii of curvature at the upper portion and at the lower portion. This shape is intended to increase the deflection of the jet in one certain direction (downwards in the case of FIG. 8).

FIG. 9 shows an asymmetric extension 17b of this kind, which comprises in addition a portion 20 which is movable in translation parallel to the axis of the nozzle and is operated by a double-acting hydraulic jack 21. This portion 20 of the extension 17B can thus be brought into the position shown in chain-dotted lines in which it forms a guiding blade for the jet deflected by the flap-nozzle 3 and by the fixed upstream portion of the convex deflecting edge located opposite this flap nozzle. This arrangement enables the angle of deflection of the jet to be still further increased.

All the devices previously described and which are not in any sense limitative, are applicable not only to separate turbo-jet units and ram-jet units, but also find an application in all the combinations and all internal combustion machines of the continuous-flow type.

FIG. 10 shows the rear portion of a combined propulsion unit comprising a turbo-jet unit having its discharge-nozzle at 22, this turbo-jet unit being mounted inside the casing of a ram-jet unit 23. The turbo-jet cycle thus takes place in the central part of the propulsion group, whilst the ram-jet cycle is effected in the annular interior space surrounding the turbo-jet unit.

The circular discharge nozzle of the turbo-jet 22, and also the annular nozzle of the ram-jet 23 have a neck on the walls of which are formed openings for the passage of articulated flap-nozzles 7 such as those previously described.

By way of an alternative form of construction however, there have been shown in the interior of the propulsion group flap-nozzles formed in the shape of a T and which can pivot in both directions: by turning them towards the axis of the propulsion group, that is to say towards the interior of the turbo-jet nozzle 22, a deflection or constriction effect is applied only to the turbo-jet unit. On the other hand, by turning these T-shaped flaps towards the exterior, action is made only on the flow of the ram-jet unit. In order to deflect the jet of the turbo-jet unit together with that of the ram-jet unit in the same direction, it is of course only necessary to displace the T-shaped flaps in a parallel direction so that one acts on the flow of the turbo-jet unit whilst the other acts on a portion of the flow of the ram-jet unit.

FIG. 11 shows an arrangement similar to that which has been described with regard to FIG. 2, but in which the valves 16 for regulating the supply of compressed air to the nozzles 9 are replaced by a nozzle 24 directed perpendicular to the compressed-air supply pipe 10, this nozzle 24 being itself supplied with compressed air through a conduit 25 which may comprise a control valve (not shown). The jet produced by the nozzle 24 across the pipe 10 enables the flow through the said pipe to be varied.

Instead of placing the fluid valve 24 at a point on the piping system 10, a similar arrangement can be provided at the outlet of the blowing nozzle 9, as shown in FIG. 12. In this case, the conduit system 25 supplies an injector 26 directed perpendicularly with respect to the nozzle 9. Thus the jet produced by the injector 26 may oppose the effect of the annular jet created by the nozzle 9 and may annul it or reduce it, depending on the case.

It will of course be understood that modifications may be made to the forms of embodiment which has just been described, especially by the substitution of equivalent technical means, without thereby departing from the spirit or from the scope of the present invention.

What is claimed is:

1. In a discharge nozzle equipped with afterburners, a device for varying the cross-section area of the gaseous stream issuing from the outlet of said nozzle, comprising in combination a plurality of movable screen-like members distributed around said outlet, operative means moving all of said members to a non-after burning position wherein they project into said stream substantially perpendicular thereto to form a partial obstruction to the flow path thereof and to an after-burning position wherein they are retracted whereby the stream flows clear of said members, nozzle means at the inward end of and communicating with said members, said members being hollow and acting as blowing means feeding said nozzle means with fluid under pressure for forming screen-like fluid jets extending the obstruction formed by said screen-like members, said nozzle means being directed toward the axis of said nozzle whereby said screen-like fluid jets are in substantially perpendicular direction relatively to the axis of the unit when said members are in projected position, and control means for controlling said blowing means so that said screen-like fluid jets effect minor variations of cross-section area of said gaseous stream while said screen-like members effect large variations of said area.

2. Device as claimed in claim 1, wherein the outlet of the jet propulsion unit is of substantially circular shape, the movable screen-like members have inward edges substantially in the form of arcs of a circle concentric with and of smaller radius than said circular outlet, said members being constructed and arranged so that said inward edges thereof form a substantially continuous circle when said members are all in projected position, whereby the exhaust area of the jet propulsion unit is reduced from that of the circular outlet to that of the circular surface bounded by said inward ends.

3. Device as claimed in claim 2, wherein the nozzle means are in the form of slots extending along and substantially coextensive with the arcuate inward edges of the members, whereby the fluid jets issuing from said nozzle means, when said members are in projected position, form a substantially continuous annular fluid screen.

4. A device for controlling the gaseous stream issuing from the outlet of a jet propulsion unit, comprising the combination of a plurality of movable screen-like members distributed around said outlet, of separate operative means operating said members to a position wherein they project into said stream substantially perpendicular thereto to form a partial obstruction to the flow path thereof and to another position wherein they are retracted whereby the stream flows clear of said members, of nozzle means at the inward end of said members, said members being hollow and acting as blowing means, feeding said nozzle means with fluid under pressure for forming screen-like fluid jets extending the obstruction formed by said screen-like members, said nozzle means being directed towards the axis of the unit, whereby said screen-like fluid jets are in a substantially perpendicular direction relatively to the axis of the unit, when said members are in projected position of first flexible control means controlling said operative means to effect a rough control of the gaseous stream and of second flexible control means comprising auxiliary blowing means controlling said first mentioned blowing means to effect an accurate control of the gaseous stream.

5. Device as claimed in claim 4, comprising further a divergent extension of the jet propulsion unit, downstream of the outlet thereof and at a distance therefrom to provide a gap, the screen-like members being movable through said gap to projected and retracted positions.

6. Device as claimed in claim 5, wherein the divergent extension is dissymmetrical with respect to the axis of the jet propulsion unit and comprises arcuate portions of different radii of curvature.

7. Device as claimed in claim 4, wherein the jet propulsion unit ends with a divergent section and the movable members are positioned downstream of said section.

8. Device as claimed in claim 4, wherein the jet propulsion unit comprises two coaxial motive flows; an inner flow and an annular outer flow surrounding said inner flow, and wherein the movable members carrying the nozzle means are projectable selectively into said inner flow and outer flow.

9. A device for controlling the gaseous stream issuing from the outlet of a jet propulsion unit, comprising the combination of a plurality of movable screen-like members distributed around said outlet, of separate operative means operating said members to a position wherein they project into said stream substantially perpendicular thereto to form a partial obstruction to the flow path thereof and to another position wherein they are retracted whereby the stream flows clear of said members, of nozzle means at the inward end of and communicating with said members, said members being hollow and acting as blowing means, feeding said nozzle means with fluid under pressure for forming screen-like fluid jets extending the obstruction formed by said screen-like members, said nozzle means being directed towards the axis of the unit, whereby said screen-like fluid jets are in a substantially perpendicular direction relatively to the axis of the unit, when said members are in projected position, of first flexible control means controlling said operative means to effect a rough control of the gaseous stream and of second flexible control means comprising auxiliary blowing means controlling said first mentioned blowing means to effect an accurate control of the gaseous stream, and comprising further a divergent extension of the jet propulsion unit, downstream of the outlet thereof and at a distance therefrom to provide a gap, the screen-like members being movable through said gap to projected and retracted positions, said divergent extension comprising a section movable parallel to the axis of the jet propulsion unit to form a deflector vane.

(References on following page)

References Cited in the file of this patent

UNITED STATES PATENTS

| | | |
|---|---|---|
| 2,509,238 | Martin | May 30, 1950 |
| 2,526,510 | Smith | Oct. 17, 1950 |
| 2,569,497 | Schiesel | Oct. 2, 1951 |
| 2,651,172 | Kennedy | Sept. 8, 1953 |
| 2,654,552 | Jonas | Oct. 6, 1953 |
| 2,657,575 | Allen | Nov. 3, 1953 |
| 2,694,898 | Stauff | Nov. 23, 1954 |
| 2,726,507 | Baker et al. | Dec. 13, 1955 |
| 2,770,944 | Jordan | Nov. 20, 1956 |
| 2,822,996 | Von Zborowski | Feb. 11, 1958 |
| 2,875,578 | Kadosch et al. | Mar. 3, 1959 |

FOREIGN PATENTS

| | | |
|---|---|---|
| 63,348 | France | Mar. 30, 1955 |
| | (1st addition to No. 1,030,483) | |
| 64,773 | France | June 29, 1955 |
| | (2nd addition to No. 1,020,287) | |
| 1,057,271 | France | Oct. 28, 1953 |
| 1,088,984 | France | Sept. 22, 1954 |
| 1,125,036 | France | July 9, 1956 |
| 750,618 | Great Britain | June 20, 1956 |